United States Patent
Xie et al.

(10) Patent No.: US 10,696,841 B2
(45) Date of Patent: Jun. 30, 2020

(54) POLYCARBONATE COMPOSITION AND PREPARATION METHOD THEREOF

(71) Applicant: KINGFA SCI. & TECH. CO., LTD., Guangdong (CN)

(72) Inventors: Xiuhao Xie, Guangdong (CN); Donghai Sun, Guangdong (CN); Yin Cen, Guangdong (CN); Wei Tong, Guangdong (CN); Junwei Ai, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 122 days.

(21) Appl. No.: 15/576,853

(22) PCT Filed: May 27, 2016

(86) PCT No.: PCT/CN2016/083633
§ 371 (c)(1),
(2) Date: Nov. 27, 2017

(87) PCT Pub. No.: WO2016/188478
PCT Pub. Date: Dec. 1, 2016

(65) Prior Publication Data
US 2018/0163047 A1 Jun. 14, 2018

(30) Foreign Application Priority Data

May 27, 2015 (CN) .......................... 2015 1 0277618

(51) Int. Cl.
| | | |
|---|---|---|
| C08L 69/00 | (2006.01) | |
| C08K 5/13 | (2006.01) | |
| C08L 21/00 | (2006.01) | |
| C08L 27/18 | (2006.01) | |
| C08L 55/02 | (2006.01) | |
| C08L 83/04 | (2006.01) | |
| C08L 51/06 | (2006.01) | |

(52) U.S. Cl.
CPC ............... *C08L 69/00* (2013.01); *C08L 21/00* (2013.01); *C08L 27/18* (2013.01); *C08L 83/04* (2013.01); *C08K 5/13* (2013.01); *C08L 51/06* (2013.01); *C08L 55/02* (2013.01); *C08L 2201/02* (2013.01); *C08L 2205/03* (2013.01)

(58) Field of Classification Search
CPC .......... C08L 69/00; C08L 55/02; C08L 83/04; C08L 27/18; C08L 21/00; C08L 2205/03; C08L 2201/02; C08L 51/06; C08L 51/04; C08K 5/13; C08K 5/0066; C08K 5/005; C08K 5/521
USPC ......................................................... 524/81
See application file for complete search history.

(56) References Cited

U.S. PATENT DOCUMENTS 6,063,844 A * 5/2000 Barren ................. C08K 5/0008
524/117

FOREIGN PATENT DOCUMENTS

| CN | 1304427 | 7/2001 |
| CN | 104893271 | 9/2015 |
| EP | 0900827 | 3/1999 |
| JP | H0726101 | 1/1995 |
| KR | 20060000706 | 1/2006 |
| WO | 2007065579 | 6/2007 |

OTHER PUBLICATIONS

KR 20060000706 A, machine translation, EPO espacenet. (Year: 2006).*
"International Search Report (FORM PCT/ISA/210)", dated Sep. 7, 2016, with English translation thereof, pp. 1-4.

* cited by examiner

*Primary Examiner* — Josephine L Chang
(74) *Attorney, Agent, or Firm* — JCIPRNET

(57) ABSTRACT

A polycarbonate composition includes the following components in parts by weight: a. 30 to 86 parts of polycarbonate; b. 0.0001 to 1 part of phenols; c. 0.01 to 5 parts of hindered phenol substance; d. 8 to 50 parts of a rubber-modified graft polymer; e. 5 to 25 parts of a fire retardant; and f. 0 to 10 parts of a fire retardant synergist; wherein a sum of parts by weight of the six components a, b, c, d, e and f is 100.

17 Claims, No Drawings

1 …

POLYCARBONATE COMPOSITION AND PREPARATION METHOD THEREOF

CROSS-REFERENCE TO RELATED APPLICATION

This application is a 371 application of International PCT application Ser. No. PCT/CN2016/083633, filed on May 27, 2016, which claims the priority benefit of Chinese application no. 201510277618.7, filed on May 27, 2015. The entirety of each of the above-mentioned patent applications is hereby incorporated by reference herein and made a part of this specification.

TECHNICAL FIELD

The present invention relates to the technical field of engineering plastics, particularly relates to a polycarbonate composition and a preparation method thereof.

BACKGROUND

Polycarbonate (PC) is a thermoplastic resin with an excellent impact resistance, heat resistance and thermal stability, widely used in fields such as electronic and electrical appliances, information technology equipment, mechanics and automobiles; and to improve its processability and overcome a disadvantage of being sensitive to a notch impact, rubber-modified polymers such as ABS, MBS and the like may generally be added. Particularly, a PC/ABS alloy having PC and ABS as main raw materials is an important engineering plastic, which can synthesize excellent properties of the both, thereby improving a physical property and the processability. However, a solvent resistance property of the PC/ABS alloy is relatively poor, for a PC resin is an amorphous material, such that poor conditions such as a generation of creak on material articles are caused by deepening of a solvent, and more seriously a failure on usability will be caused. Therefore, a PC/ABS alloy with excellent solvent resistance property is urgently needed.

In the prior art, such as EP-A900827, the solvent resistance property of a polycarbonate alloy is improved by an ABS prepared by a modified emulsion method. The solvent resistance property of the polycarbonate alloy is improved, but a drawback is that a system lacks of the thermal stability. WO-A2007/065579 has described that organic carboxylic acids are used to stabilize the solvent resistance property of the polycarbonate, but a shortcoming is that a degradation of the polycarbonate will be caused, and even resulting in molding defects.

Until now, no influences of introduction of phenols and a hindered phenol substance on the solvent resistance property, a flowability and the thermal stability of a polycarbonate composition have been reported.

With a result of extensive experiments, the inventor surprisingly has found that, when specific contents of the phenols and the hindered phenol substance are added in a polycarbonate composition formula, the obtained polycarbonate composition has excellent solvent resistance property and flowability, and can remain good thermal stability.

SUMMARY OF THE INVENTION

To overcome disadvantages and shortcomings of the prior art, an object of the present invention is to provide a polycarbonate composition having an excellent solvent resistance property and flowability, and can remain a good thermal stability.

Another object of the present invention is to provide a preparation method of the above-described polycarbonate composition.

The present invention is accomplished by the following technical solution:

a polycarbonate composition, which includes the following components in parts by weight:
  a. 30 to 86 parts of a polycarbonate;
  b. 0.0001 to 1 part of phenols as shown in Formula I;
  c. 0.01 to 5 parts of a hindered phenol substance as shown in Formula II;
  d. 8 to 50 parts of a rubber-modified graft polymer;
  e. 5 to 25 parts of a fire retardant; and
  f. 0 to 10 parts of a fire retardant synergist;
  wherein a sum of parts by weight of the six components a, b, c, d, e and f is 100.
  wherein a structural formula of Formula I is as follow:

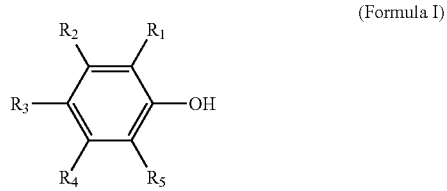
(Formula I)

wherein $R_1$ and $R_5$ represent a hydrogen group, an alkyl, an alkoxy, a hydroxyl, a carboxyl or a carbonyl, and an ester group, except for a hindered group. $R_2$, $R_3$ and $R_4$ represent a substituent containing hydrogen atoms, preferably the hydrogen atom.

Wherein a molecular formula of Formula II is $C_nO_mR$, wherein n is greater than 2, m is greater than 2, and R represents a heteroatom, preferably a long-chain substituent of N atom and S atom, and more preferably a long-chain substituent containing N having a symmetrical structure and containing an aryl group.

Preferably, a polycarbonate composition includes the following components in parts by weight:
  a. 30 to 86 parts of the polycarbonate;
  b. 0.005 to 0.2 part of the phenols as shown in Formula I;
  c. 0.03 to 1 part of the hindered phenol substance as shown in Formula II;
  d. 8 to 50 parts of the rubber-modified graft polymer;
  e. 5 to 25 parts of the fire retardant; and
  f. 0 to 10 parts of the fire retardant synergist;
  wherein a sum of parts by weight of the six components a, b, c, d, e and f is 100;
  wherein the structural formula of Formula I is as follow:

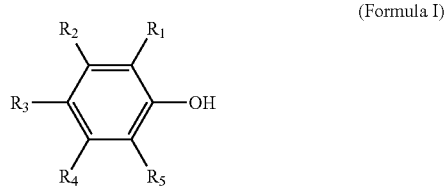
(Formula I)

wherein $R_1$ and $R_5$ represent the hydrogen group, the alkyl, the alkoxy, the hydroxyl, the carboxyl or the carbonyl, and the ester group, except for the hindered group. $R_2$, $R_3$ and $R_4$ represent the substituent containing hydrogen atoms, preferably the hydrogen atom.

Wherein the molecular formula of Formula II is $C_nO_mR$, wherein n is greater than 2, m is greater than 2, and R represents the heteroatom, preferably the long-chain substituent of N atom and S atom, and more preferably the long-chain substituent containing N having the symmetrical structure and containing the aryl group.

More preferably, a polycarbonate composition includes the following components in parts by weight:
a. 30 to 86 parts of the polycarbonate;
b. 0.01 to 0.05 part of the phenols as shown in Formula I;
c. 0.05 to 0.1 part of the hindered phenol substance as shown in Formula II;
d. 8 to 50 parts of the rubber-modified graft polymer;
e. 5 to 25 parts of the fire retardant; and
f. 0 to 10 parts of the fire retardant synergist;
wherein a sum of parts by weight of the six components a, b, c, d, e and f is 100;
wherein the structural formula of Formula I is as follow:

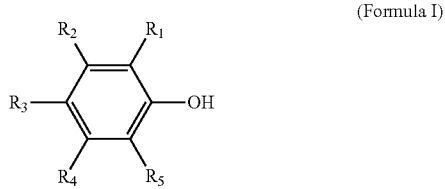

(Formula I)

wherein $R_1$ and $R_5$ represent the hydrogen group, the alkyl, the alkoxy, the hydroxyl, the carboxyl or the carbonyl, and the ester group, except for the hindered group. $R_2$, $R_3$ and $R_4$ represent the substituent containing hydrogen atoms, preferably the hydrogen atom.

Wherein the molecular formula of Formula II is $C_nO_mR$, wherein n is greater than 2, m is greater than 2, and R represents the heteroatom, preferably the long-chain substituent of N atom and S atom, and more preferably the long-chain substituent containing N and having the symmetrical structure and containing the aryl group.

Wherein a testing method of a content of the phenols is as follow: after 2 g of a polycarbonate composition is weighed using an electronic balance, a sample is put into a constant temperature oven of which the temperature is uniform and stable, for 2 hours with a preset temperature of 120° C. followed by being put into a Soxhlet extractor device to perform extracting with methanol, an extracting temperature is 85° C., and the time is 48 hours; after an extraction solution is set into a constant temperature, 20 μL of the extraction solution is extracted with a filter screen and then is injected into an adsorption column of C18 to perform separation and quantifying with the help of a mobile phase (methanol:purified water=90:10) at a flow rate of 10 ml/min; after a standard curve is created by creating standard solutions of 1 ppm, 5 ppm, 10 ppm and 20 ppm, the content of the phenols may be calculated by a specific efflux time of a standard sample and an extrapolation method.

Preferably, the phenols as shown in Formula I are selected from one or more of phenol and a long-chain alkyl phenol.

Preferably, the hindered phenol substance as shown in Formula II is selected from a 3,5-di-tert-butyl phenol, preferably octadecyl 3-(3,5-di-tert-butyl-4-hydroxyphenyl)propionate.

Wherein, the phenols as shown in Formula I in the polycarbonate composition and the hindered phenol substance as shown in Formula II in the polycarbonate composition may have different weight percentages. In the polycarbonate composition, a ratio by weight percentage of the phenols as shown in Formula I to the hindered phenol substance as shown in Formula II is 0.001 to 20.

The polycarbonate is selected from one or more of an aromatic polycarbonate, an aliphatic polycarbonate, an aromatic-aliphatic polycarbonate, a branched polycarbonate, and a siloxane copolycarbonate; preferably the aromatic polycarbonate, the aromatic polycarbonate is an aromatic polycarbonate with a viscosity-average molecular weight of 13000 to 40000, preferably an aromatic polycarbonate with a viscosity-average molecular weight of 16000 to 28000.

The rubber-modified graft polymer is selected from one or more of a graft copolymer prepared by a bulk polymerization method, a graft copolymer prepared by an emulsion polymerization method, and a graft copolymer prepared by a bulk-suspension polymerization method.

The bulk polymerization method includes five steps such as dissolving rubber, prepolymerizing, polymerizing, devolatilizing and pelletizing, more particularly, dissolving a rubber in ethylbenzene and styrene; adding monomers in accordance with a formulation amount to prepare into a raw material solution, inputting the prepared raw material solution into a prepolymerizer to perform prepolymerization; during polymerizing, grafting the monomers to the rubber, copolymerizing the monomers at the same time, separating from the solution, forming a discontinuous phase dispersed in a continuous phase in the raw material solution, after enough monomers are polymerized, a copolymer in the discontinuous phase becomes a continuous phase, and the grafted rubber forms a discontinuous phase which is dispersed in the continuous copolymer phase, thereby accomplishing a phase transition; finally, performing further polymerization, vacuum degassing, extruding, cooling and pelletizing to obtain a final product.

The bulk-suspension polymerization method includes: regulating a rubber and a monomer solution in accordance with a formula, and adding a polymerization regulator and a radical initiator at the same time; performing bulk polymerization on a monomer mixture at 80° C. to 120° C., continuously stirring during polymerizing, and adding deionized water and a suspending agent into the mixture to ensure that the mixture is dispersed; and then performing suspension polymerization by using a radical catalyst, performing coagulating, filtering, washing, dehydrating and drying after obtaining a certain polymerization degree, and then pelletizing to obtain a product.

The emulsion polymerization method includes: grafting a rubber by controlling a polymerization temperature at 50° C. to 80° C., and adding a monomer mixture into a rubber latex in the presence of an initiator, deionized water, an emulsifier and a cross-linking agent, and finally pelletizing to obtain a product after performing washing, dehydrating and drying.

Wherein, the rubber-modified graft polymer is selected from graft polymers containing the following b.1 on b.2 in parts by weight:
b.1 5 to 95 parts of a mixture of b.1.1 and b.1.2:
b.1.1 50 to 95 parts of one or more of styrene, styrene derivatives such as α-methyl styrene, p-benzyl styrene and divinyl styrene, C1-C8 alkyl methacrylate, C1-C8 alkyl acrylate, dimethyl siloxane, phenyl siloxane, and multi-alkyl siloxane;

b.1.2 5 to 50 parts of one or more of acrylonitrile, methyl acrylonitrile, C1-C8 alkyl methacrylate, and C1-C8 alkyl acrylate;

b.2 5 to 95 parts of one or more of polybutadiene, polyisoprene, a random copolymer and a block copolymer of styrene-butadiene, a random copolymer and a block copolymer of acrylonitrile-butadiene, a copolymer of polybutadiene and polyisoprene, a copolymer of ethylene and α-alkene, a copolymer of ethylene and α-unsaturated carboxylate, a terpolymer of ethylene-propene-nonconjugated diene, an acryloyl rubber, and an organic siloxane rubber.

Wherein, the rubber-modified graft polymer includes rubber polymer substrates having a Tg less than 10° C., less than 0° C., less than −10° C., or ranging from −40° C. to −80° C., and a rigid polymer such as styrene, acrylonitrile, an acrylate and the like grafting to the rubber polymer substrate. A material suitable for using as the rubber includes a conjugated diene and the like, an olefin rubber such as a copolymer of ethylene and propylene EPR or an ethylene-propylene-diene monomer rubber EPDM and an ethylene-vinyl acetate rubber; a silicone rubber; the C1-8 alkyl methacrylate ester of an elastomer, and an elastomeric copolymer of the C1-8 alkyl methacrylate ester and butadiene or styrene; or includes a combination containing at least one of the above-described elastomers. A material suitable for a rigid phase includes, for example a monovinyl aromatic monomer such as styrene and α-methylstyrene, and a monovinyl monomer such as acrylonitrile, acrylic acid, methacrylic acid and C1-C6 esters of acrylic acid and methacrylic acid, specifically methyl methacrylate.

Preferably, the rubber-modified graft polymer is selected from one or more of a styrene-butadiene-styrene SBS, a styrene-butadiene rubber SBR, a styrene-ethylene-butadiene-styrene SEBS, a graft copolymer of acrylonitrile-butadiene-styrene ABS, a terpolymer of acrylonitrile-styrene-acrylic acid ASA or a graft copolymer of methyl methacrylate-butadiene-styrene MBS, and a styrene-acrylonitrile SAN, preferably the graft copolymer of acrylonitrile-butadiene-styrene ABS; wherein, a particle diameter of the MBS is preferably 0.1 μm to 0.5 μm, a particle diameter of the ABS in the bulk polymerization method is preferably 0.1 μm to 2 μm, and a particle diameter of the ABS in the emulsion polymerization method is preferably 0.05 μm to 0.2 μm.

The fire retardant is selected from a halogen-based fire retardant or a halogen-free fire retardant, preferably the halogen-free fire retardant; the halogen-based fire retardant is selected from one or more of a brominated polystyrene, a brominated polyphenyl ether, a brominated bisphenol A type epoxy resin, a brominated copolymer of styrene-maleic anhydride, a brominated epoxy resin, a brominated phenoxy resin, decabromodiphenyl oxide, decabromodiphenyl, a brominated polycarbonate, perbromotricyclopentadecane or a brominated aromatic cross-linked polymer, preferably the brominated polystyrene; the halogen-free fire retardant is selected from one or more of a nitrogen-containing fire retardant, a phosphorus-containing fire retardant or a nitrogen- and phosphorus-containing fire retardant, preferably the phosphorus-containing fire retardant.

The phosphorus-containing fire retardant is selected from one or more of triphenyl phosphate, tritolyl phosphate, tolyl diphenyl phosphate, trixylyl phosphate, tri(2,4,6-trimethyl phenyl) phosphate, tri(2,4-di-tert-butyl phenyl) phosphate, tri(2,6-di-tert-butyl phenyl) phosphate, resorcinol bis(diphenyl phosphate), hydroquinone bis(diphenyl phosphate), bisphenol A-bis(diphenyl phosphate), resorcinol bis(2,6-di-tert-butyl phenyl phosphate), and hydroquinone bis(2,6-dimethyl phenyl phosphate).

Wherein, the fire retardant synergist is selected from a silicon-containing substance and/or a fluorine-containing substance; the silicon-containing substance is selected from one or more of silicon oil, a siloxane and a siloxane copolymer; and the fluorine-containing substance is selected from polytetrafluoroethylene and/or a master batch containing polytetrafluoroethylene.

The siloxane copolymer includes a polydimethyl siloxane block, wherein the polydimethyl siloxane block has a polymerization degree of 30 to 100 dimethyl siloxane parts, a repetitive unit may have a specific block length and can enable the composition to have a relatively good tenacity at low temperature.

Besides, the above-described polycarbonate composition, further includes other processing aids. The other processing aids are selected from one or more of a heat stabilizer, a plasticizer, a releasing agent, a filler, and a colorant.

The suitable stabilizer includes an organic phosphite such as triphenyl phosphite, tri(2,6-dimethyl phenyl) phosphite and tri(nonyl phenyl) phosphite, dimethyl phenyl phosphonate, trimethyl phosphate and the like; and one or combinations of the organic phosphite, an alkylated monophenol or polyphenol, an alkylated reaction product of a polyphenol and a diene, a butylated reaction product of p-cresol or dicyclopentadiene, alkylated hydroquinones, hydroxylated thiodiphenyl ethers, alkylene-bisphenol, benzyl compounds, polyol esters, benztriazoles, and bonzo phenones.

The suitable plasticizer is phthalate.

The suitable releasing agent includes metallic stearates, alkyl stearates, pentaerythritol stearates, paraffin, lignite wax, and the like.

The suitable filler includes glass fiber, glass powder, wollastonite, calcium carbonate, barium sulfate, talc powder, metallic powder, and the like.

The suitable colorant includes various pigments, dyes for example inorganic pigments like a metallic oxide and a mixed metallic oxide, such as zinc oxide, titanium oxide and ferric oxide, a sulfide such as zinc sulfide and the like; an aluminate, a silicate, a chromate, a ferrite and so on, carbon black and ultramarine; and organic pigments such as azos, diazos, anthraquinones, anthrones, phthalocyanine, quinolines, naphthalenes, ketones, -zines and the like.

A preparation method of the above-described polycarbonate composition includes the following steps:

(1) blending the phenols as shown in Formula I, the hindered phenol substance as shown in Formula II and the polycarbonate uniformly in a high-speed mixer to obtain a mixed material;

(2) adding the mixed material into a twin screw extruder through a main feed port along with the rubber-modified graft polymer, the fire retardant and the fire retardant synergist, extruding, cooling by means of water, and pelletizing to obtain a columnar particulate polycarbonate composition.

The polycarbonate composition of the present invention can be used in outdoor and indoor application fields, for example shell parts of various types and sizes, household appliances such as a TV set, a printer, a modem shell and a display shell, or automobile parts for outdoor use, an enclosure or cover in a building field, and a housing and a frame for an electrical appliance.

Compared with the prior art, the present invention has the following advantageous effects:

According to the present invention, when specific contents of the phenols as shown in Formula I and the hindered phenol substance as shown in Formula II are added in a polycarbonate composition formula, the obtained polycarbonate composition has excellent solvent resistance property and flowability, and can remain good thermal stability.

DETAILED DESCRIPTION OF THE PREFERRED EMBODIMENT

The present invention will be further described below by detailed implementations, the following embodiments are preferred implementations of the present invention, but the implementations of the present invention are not limited by the following embodiments.

Testing standards or methods of various properties:

a testing method of a content of phenols: after 2 g of a polycarbonate composition was weighed using an electronic balance, a sample was put into a constant temperature oven of which the temperature was uniform and stable, for 2 hours with a preset temperature of 120° C. followed by being put into a Soxhlet extractor device to perform extracting with methanol, an extracting temperature was 85° C., and the time was 48 hours; after an extraction solution was set into a constant temperature, 20 μL of the extraction solution was extracted with a filter screen and then was injected into an adsorption column of C18 to perform separation and quantifying with the help of a mobile phase (methanol:purified water=90:10) at a flow rate of 10 ml/min; after a standard curve was created by creating standard solutions of 1 ppm, 5 ppm, 10 ppm and 20 ppm, the content of the phenols may be calculated by a specific efflux time of a standard sample and an extrapolation method.

A testing method of an alcohol resistance (%): a test piece was prepared by using an 80-ton injection molding machine made by Nissei Plastic Industrial Co., Ltd., under a condition that a barrel temperature was 280° C. and a mold temperature of was 80° C. A dumbbell-shaped test piece No. JIS 1 prepared by the above-described method was soaked in methanol of 23° C. for 7 days. Tensile yield strengths of the test piece before and after soaking were tested according to the method of JIS K7113. A ratio (%) of "the tensile yield strength of the test piece after soaking" to "the tensile yield strength of the test piece before soaking" was calculated, as the alcohol resistance (%).

A testing method of processing defects: a molded part of 10 cm (length)×4 cm (width)×1 cm (thickness) was prepared by injection molding, and appearance (a hue and a surface appearance) of the molded part was observed. The molded part having hues which were not unpleasant and having smooth and good surface appearance, may be evaluated as "good"; while those having unpleasant colors and having rough and bad surface appearance, may be evaluated as "bad".

A testing method of a flow length: under a condition that the barrel temperature was 280° C., the injection pressure was 74 MPa and the mold temperature was 80° C., melting resin was injection molded in a flat panel-shaped mold with the thickness of 0.5 mm and the width of 40 mm, and a flow length at this moment was tested as the flow length. Besides, when the flow length was not a constant value at each location based on the width or the thickness of the injection molded flat panel, a sum of the maximum flow length and the minimum flow length was divided by 2 to obtain a value as the flow length. The material having the higher flowability showed the greater value.

A testing method of a thermal decomposition temperature (° C.): 10 mg of the composition was heated from 30° C. to 500° C. at a rate of 20° C./min under a nitrogen atmosphere using a thermogravimetric measurement device (made by PerkinElmer Company, "TGA-7"). The temperature at which a mass reduced by 5 wt % compared with the mass before heating was regarded as the thermal decomposition temperature; the more stable the thermal decomposition, the better the thermal stability of the composition.

The polycarbonates used in the present invention:
a component a-1: FN1900 (Idemitsu, Japan); and
a component a-2: H2200 (Mitsubishi, Japan);
the phenols as shown in Formula I used in the present invention:
a component b: phenol (TCI, Shanghai);
the hindered phenol substance as shown in Formula II used in the present invention:
a component c: octadecyl 3-(3,5-di-tert-butyl-4-hydroxyphenyl)propionate (BASF);
the rubber-modified graft polymers used in the present invention:
a component d-1: ABS 8391 (Gaoqiao, Shanghai); and
a component d-2: MBS EM500 (LG, Korea);
a fire retardant used in the present invention:
a component e: BDP (IDECO);
a fire retardant synergist in the present invention:
a component f: PTFE (polytetrafluoroethylene) as the fire retardant synergist.

Embodiments 1-9 and Comparative Embodiments 1-9: Preparation of the Polycarbonate Composition According to formulas in Table 1, blending the phenols as shown in Formula I, the hindered phenol substance as shown in Formula II and the polycarbonate uniformly in a high-speed mixer to obtain a mixed material; adding the mixed material into a twin screw extruder through a main feed port along with the rubber-modified graft polymer, the fire retardant and the fire retardant synergist, extruding, cooling by means of water, and pelletizing to obtain a columnar particulate polycarbonate composition; and testing property indices of the polycarbonate composition such as the alcohol resistance (%), the processing defects, the flow length and the thermal decomposition temperature. Data are listed in Table 1.

TABLE 1

Specific proportions (parts by weight) and property testing results of Embodiments 1-9 and Comparative Embodiments 1-9

|  | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| component a-1 | 60 | 65 | 66 |  |  |  | 60 | 65 | 66 |
| component a-2 |  |  |  | 60 | 65 | 66 |  |  |  |
| component b | 1 | 0.2 | 0.05 | 0.8 | 0.1 | 0.01 | 0.0001 | 0.15 | 0.03 |

TABLE 1-continued

Specific proportions (parts by weight) and property testing results of Embodiments 1-9 and Comparative Embodiments 1-9

| | | | | | | | | | |
|---|---|---|---|---|---|---|---|---|---|
| component c | 5 | 0.01 | 0.02 | 0.7 | 0.3 | 0.89 | 0.1 | 0.05 | 0.07 |
| component d-1 | 9 | | 28.93 | | 21.1 | 28.1 | | 21.3 | |
| component d-2 | | 21.29 | | 13.5 | | | 14.8999 | | 28.9 |
| component e | 15 | 10 | 5 | 15 | 10 | 5 | 15 | 10 | 5 |
| component f | 10 | 3.5 | 0 | 10 | 3.5 | 0 | 10 | 3.5 | 0 |
| alcohol resistance (%) | 58 | 60 | 73 | 62 | 70 | 82 | 77 | 85 | 90 |
| processing defects | good | good | good | good | good | good | good | good | good |
| flow length (mm) | 108 | 113 | 127 | 115 | 122 | 142 | 133 | 143 | 147 |
| thermal decomposition temperature (° C.) | 320 | 332 | 385 | 350 | 380 | 408 | 390 | 415 | 430 |

| | Comparative Embodiment 1 | Comparative Embodiment 2 | Comparative Embodiment 3 | Comparative Embodiment 4 | Comparative Embodiment 5 | Comparative Embodiment 6 | Comparative Embodiment 7 | Comparative Embodiment 8 | Comparative Embodiment 9 |
|---|---|---|---|---|---|---|---|---|---|
| component a-1 | 60 | 65 | 66 | | | | 60 | 65 | 66 |
| component a-2 | | | | 60 | 65 | 66 | | | |
| component b | 1 | 1.5 | — | 0.205 | 0.00001 | 0.2 | 2 | 4 | — |
| component c | 6 | 0.5 | — | 0.005 | 0.12999 | — | 8 | 9 | 0.1 |
| component d-1 | 8 | | 29 | | 21.37 | 28.8 | | 8.5 | |
| component d-2 | | 20 | | 14.79 | | | 10 | | 28.9 |
| component e | 15 | 10 | 5 | 15 | 10 | 5 | 10 | 10 | 5 |
| component f | 10 | 3 | 0 | 10 | 3.5 | 0 | 10 | 3.5 | 0 |
| alcohol resistance (%) | 40 | 33 | 22 | 35 | 32 | 30 | 38 | 33 | 22 |
| processing defects | bad | bad | bad | bad | bad | bad | bad | bad | bad |
| flow length (mm) | 60 | 62 | 63 | 79 | 66 | 54 | 63 | 54 | 33 |
| thermal decomposition temperature (° C.) | 285 | 282 | 284 | 280 | 280 | 287 | 280 | 292 | 290 |

It may be seen from a comparison of Embodiments with Comparative Embodiments in Table 1 that, according to the present invention, when specific contents of the phenols as shown in Formula I and the hindered phenol substance as shown in Formula II are added in a polycarbonate composition formula, the obtained polycarbonate composition has an excellent solvent resistance property and flowability, and can remain a good thermal stability.

What is claimed:

1. A polycarbonate composition, comprising the following components in parts by weight:
   a. 30 to 86 parts of a polycarbonate;
   b. 0.0001 to 0.1 part of phenols as shown in Formula I;
   c. 0.01 to 5 parts of a hindered phenol substance as shown in Formula II;
   d. 8 to 50 parts of a rubber-modified graft polymer;
   e. 5 to 25 parts of a fire retardant; and
   f. 0 to 10 parts of a fire retardant synergist;
   wherein a sum of parts by weight of the six components a, b, c, d, e and f is 100;

wherein a structural formula of Formula I is as follows

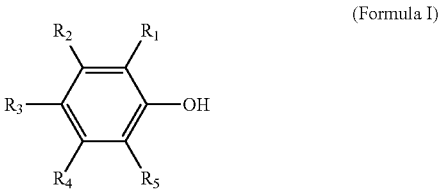

(Formula I)

wherein $R_1$ and $R_5$ represent a hydrogen group, an alkyl, an alkoxy, a hydroxyl, a carboxyl or a carbonyl, and an ester group, except for a hindered group; and $R_2$, $R_3$ and $R_4$ represent a substituent containing hydrogen atoms;

wherein a molecular formula of Formula II is $C_nO_mR$, wherein n is greater than 2, m is greater than 2, and R represents a heteroatom.

2. The polycarbonate composition according to claim 1, wherein a ratio by weight percentage of the phenols as shown in Formula I to the hindered phenol substance as shown in Formula II is 0.001 to 20.

3. The polycarbonate composition according to claim 1, comprising the following components in parts by weight:
a. 30 to 86 parts of the polycarbonate;
b. 0.005 to 0.1 part of the phenols as shown in Formula I;
c. 0.03 to 1 part of the hindered phenol substance as shown in Formula II;
d. 8 to 50 parts of the rubber-modified graft polymer;
e. 5 to 25 parts of the fire retardant; and
f. 0 to 10 parts of the fire retardant synergist;
wherein a sum of parts by weight of the six components a, b, c, d, e and f is 100;
wherein the structural formula of Formula I is as follows

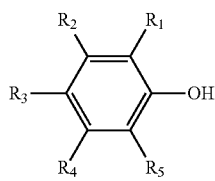

(Formula I)

wherein $R_1$ and $R_5$ represent the hydrogen group, the alkyl, the alkoxy, the hydroxyl, the carboxyl or the carbonyl, and the ester group, except for the hindered group; and $R_2$, $R_3$ and $R_4$ represent the substituent containing hydrogen atoms;
wherein the molecular formula of Formula II is $C_nO_mR$, wherein n is greater than 2, m is greater than 2, and R represents a heteroatom.

4. The polycarbonate composition according to claim 3, wherein a ratio by weight percentage of the phenols as shown in Formula I to the hindered phenol substance as shown in Formula II is 0.001 to 20.

5. The polycarbonate composition according to claim 3, comprising the following components in parts by weight:
a. 30 to 86 parts of the polycarbonate;
b. 0.01 to 0.05 part of the phenols as shown in Formula I;
c. 0.05 to 0.1 part of the hindered phenol substance as shown in Formula II;
d. 8 to 50 parts of the rubber-modified graft polymer;
e. 5 to 25 parts of the fire retardant; and
f. 0 to 10 parts of the fire retardant synergist;
wherein a sum of parts by weight of the six components a, b, c, d, e and f is 100;
wherein the structural formula of Formula I is as follows

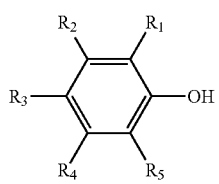

(Formula I)

wherein $R_1$ and $R_5$ represent the hydrogen group, the alkyl, the alkoxy, the hydroxyl, the carboxyl or the carbonyl, and the ester group, except for the hindered group; and $R_2$, $R_3$ and $R_4$ represent the substituent containing hydrogen atoms;
wherein the molecular formula of Formula II is $C_nO_mR$, wherein n is greater than 2, m is greater than 2, and R represents the heteroatom.

6. The polycarbonate composition according to claim 5, wherein a ratio by weight percentage of the phenols as shown in Formula I to the hindered phenol substance as shown in Formula II is 0.001 to 20.

7. The polycarbonate composition according to claim 1, wherein the polycarbonate is selected from one or more of an aromatic polycarbonate, an aliphatic polycarbonate, an aromatic-aliphatic polycarbonate, a branched polycarbonate and a siloxane copolycarbonate; wherein the aromatic polycarbonate is an aromatic polycarbonate with a viscosity-average molecular weight of 13000 to 40000.

8. The polycarbonate composition according to claim 1, wherein the phenols as shown in Formula I are selected from one or more of phenol and a long-chain alkyl phenol.

9. The polycarbonate composition according to claim 1, wherein the hindered phenol substance as shown in Formula II is selected from a 3,5-di-tert-butyl phenol.

10. The polycarbonate composition according to claim 1, wherein the rubber-modified graft polymer is selected from one or more of a graft copolymer prepared by a bulk polymerization method, a graft copolymer prepared by an emulsion polymerization method, and a graft copolymer prepared by a bulk-suspension polymerization method.

11. The polycarbonate composition according to claim 1, wherein the rubber-modified graft polymer is selected from graft polymers containing the following b.1 on b.2 in parts by weight:
b.1) 5 to 95 parts of a mixture of b.1.1 and b.1.2:
b.1.1) 50 to 95 parts of one or more of styrene, styrene derivatives comprising α-methyl styrene, p-benzyl styrene and divinyl styrene, C1-C8 alkyl methacrylate, C1-C8 alkyl acrylate, dimethyl siloxane, phenyl siloxane, and multi-alkyl siloxane;
b.1.2) 5 to 50 parts of one or more of acrylonitrile, methyl acrylonitrile, C1-C8 alkyl methacrylate, and C1-C8 alkyl acrylate;
b.2) 5 to 95 parts of one or more of polybutadiene, polyisoprene, a random copolymer and a block copolymer of styrene-butadiene, a random copolymer and a block copolymer of acrylonitrile-butadiene, a copolymer of polybutadiene and polyisoprene, a copolymer of ethylene and α-alkene, a copolymer of ethylene and α-unsaturated carboxylate, a terpolymer of ethylene-propene-nonconjugated diene, an acryloyl rubber, and an organic siloxane rubber.

12. The polycarbonate composition according to claim 11, wherein the rubber-modified graft polymer is selected from one or more of a styrene-butadiene-styrene, a styrene-butadiene rubber, a styrene-ethylene-butadiene-styrene, a graft copolymer of acrylonitrile-butadiene-styrene, a terpolymer of acrylonitrile-styrene-acrylic acid or a graft copolymer of methyl methacrylate-butadiene-styrene, and a styrene-acrylonitrile; wherein, a particle diameter of the methyl methacrylate-butadiene-styrene is 0.1 μm to 0.5 μm, a particle diameter of the acrylonitrile-butadiene-styrene in the bulk polymerization method is 0.1 μm to 2 μm, and a particle diameter of the acrylonitrile-butadiene-styrene in the emulsion polymerization method is 0.05 μm to 0.2 μm.

13. The polycarbonate composition according to claim 1, wherein the fire retardant is selected from a halogen-based fire retardant or a halogen-free fire retardant; the halogen-based fire retardant is selected from one or more of a brominated polystyrene, a brominated polyphenyl ether, a brominated bisphenol A type epoxy resin, a brominated copolymer of styrene-maleic anhydride, a brominated epoxy resin, a brominated phenoxy resin, decabromodiphenyl oxide, decabromodiphenyl, a brominated polycarbonate, perbromotricyclopentadecane or a brominated aromatic cross-linked polymer; the halogen-free fire retardant is selected from one or more of a nitrogen-containing fire retardant, a phosphorus-containing fire retardant or a nitrogen- and phosphorus-containing fire retardant.

14. The polycarbonate composition according to claim 13, wherein the phosphorus-containing fire retardant is selected from one or more of triphenyl phosphate, tritolyl phosphate, tolyl diphenyl phosphate, trixylyl phosphate, tri(2,4,6-trimethyl phenyl) phosphate, tri(2,4-di-tert-butyl phenyl) phosphate, tri(2,6-di-tert-butyl phenyl) phosphate, resorcinol bis(diphenyl phosphate), hydroquinone bis(diphenyl phosphate), bisphenol A-bis(diphenyl phosphate), resorcinol bis(2,6-di-tert-butyl phenyl phosphate), and hydroquinone bis(2,6-dimethyl phenyl phosphate).

15. The polycarbonate composition according to claim 1, wherein the fire retardant synergist is selected from a silicon-containing substance and/or a fluorine-containing substance; the silicon-containing substance is selected from one or more of a silicon oil, a siloxane and a siloxane copolymer; and the fluorine-containing substance is selected from polytetrafluoroethylene and/or a master batch containing polytetrafluoroethylene.

16. The polycarbonate composition according to claim 1, wherein the polycarbonate composition further comprises other processing aids, the other processing aids are selected from one or more of a stabilizer, a plasticizer, a releasing agent, a filler, and a colorant.

17. A preparation method of the polycarbonate composition according to claim 1, comprising the following steps:
1) blending the phenols as shown in Formula I, the hindered phenol substance as shown in Formula II and the polycarbonate uniformly in a high-speed mixer to obtain a mixed material;
2) adding the mixed material into a twin screw extruder through a main feed port along with the rubber-modified graft polymer, the fire retardant and the fire retardant synergist, extruding, cooling by means of water, and pelletizing to obtain a columnar particulate polycarbonate composition.

* * * * *